United States Patent [19]

Schmertz

[11] Patent Number: 4,886,348

[45] Date of Patent: Dec. 12, 1989

[54] TOTAL TRANSMISSIBILITY OPTICAL SYSTEM

[75] Inventor: John C. Schmertz, Pittsburgh, Pa.

[73] Assignee: Westinghouse Electric Corp., Pittsburgh, Pa.

[21] Appl. No.: 262,847

[22] Filed: Oct. 26, 1988

[51] Int. Cl.[4] .................. G02B 5/10; G21C 17/08
[52] U.S. Cl. .................... 350/622; 350/504; 350/613; 350/618; 376/248
[58] Field of Search ............... 350/504, 525, 613, 618, 350/619, 622, 620; 376/248

[56] References Cited

U.S. PATENT DOCUMENTS

| | | |
|---|---|---|
| 1,552,449 | 9/1925 | Roach . |
| 1,988,946 | 1/1935 | Hauser et al. . |
| 2,327,700 | 8/1943 | Eddy . |
| 2,683,393 | 7/1954 | Drew . |
| 2,891,437 | 6/1959 | Tripp .................. 350/620 |
| 3,792,916 | 2/1974 | Sarna .................. 350/163 |
| 3,817,605 | 6/1974 | Franklin et al. ........... 350/620 |
| 4,103,991 | 8/1978 | Kramer ................. 350/297 |
| 4,659,192 | 4/1987 | Chadwick et al. ......... 350/486 |
| 4,664,484 | 5/1987 | Hines .................. 350/394 |
| 4,691,999 | 9/1987 | Wheeler ................ 350/620 |
| 4,692,024 | 9/1987 | Bloss .................. 356/135 |
| 4,733,955 | 3/1988 | Cook .................. 350/620 |

FOREIGN PATENT DOCUMENTS

| | | |
|---|---|---|
| 245327 | 4/1912 | Fed. Rep. of Germany . |
| 593227 | 2/1934 | Fed. Rep. of Germany . |
| 279813 | 6/1934 | Italy .................. 350/622 |

Primary Examiner—Bruce Y. Arnold
Assistant Examiner—Jay Patrick Ryan
Attorney, Agent, or Firm—Michael G. Panian

[57] ABSTRACT

The total transmissibility optical system or lens is an assembly of curved members or mirrors arranged such that a beam of radiation will reflect through the apparatus and come to a focus on an opposite side. An inner member, comprised of a pair of conical reflectors joined at their respective bases, is disposed within an outer member such that their axes are parallel to the radiation beam. The outer member is comprised of a first inner reflective surface in the shape of a hollow segment of a paraboloid of revolution and a second inner reflective surface in the shape of a hollow truncated cone. The two inner reflective surfaces of the outer member are also joined at their respective bases. The mirrors are made of a highly polished metal which will reflect any type of radiation beam, such as infrared radiation as in a night vision device. The lens can be used in harsh environments, such as an irradiated environment, since the lens will not be affected thereby as will a glass lens. The lens can exactly replicate the focusing behavior of a glass lens without the absorption of light that may occur during the passage of a light beam through a glass lens.

24 Claims, 3 Drawing Sheets

TOTAL TRANSMISSIBILITY OPTICAL SYSTEM

TECHNICAL FIELD

The invention relates to optical systems, and more particularly to a total transmissibility lens for focusing any type of radiation beam at a focal point.

BACKGROUND OF THE INVENTION

In typical prior art optical systems, such as telescopes or microscopes, the means for focusing a beam of light can be either reflective or refractive. In a refractive system, a glass lens is typically used to focus light at a focal point. While a glass lens will adequately transmit visible light along with a small region of the infrared radiation spectrum, a glass lens cannot adequately focus a wide range of the radiation spectrum including the lower infrared frequencies and radar frequencies. Additionally, glass lenses are opaque to radiation at these lower frequencies. Moreover, it is not always possible to use a glass lens in environments which are hostile to glass. Examples of such environments include high nuclear radiation environments, wherein the glass lens can suffer damage due to irradiation and eventually become milky and opaque. Other harsh environments for glass lenses include extreme thermal gradients, and in situations where mechanical shock is present.

In a typical reflective type system, such as a reflecting telescope, a pair of mirrors may be arranged such that those light rays which pass around the outer periphery of the first mirror, are reflected off of a second mirror (which is concave), and directed back toward the first mirror, which is convex. The light rays then are reflected by the first mirror and brought to a focus at a focal point. If the focal point is beyond the second mirror, the light rays can pass through an opening constructed in the second miror to convege at that focal point. Alternatively, the light rays may first reflect off a curved convex mirror, get directed back toward the concave second mirror, to be brought to a focus at a focal point after passing around the outer periphery of the first mirror. FOr these arrangements the light rays are obstructed in the middle of the beam of light by at least one of the mirrors. For a telescope, this region of obstructed light rays is not important because of the great sizes and distances of the observed objects. Moreover, in the second type of arrangement rays near the center line may pass around the first lens and reach a focal point, but must do so at a final angular deviation.

It would therefore be advantageous to provide a focusing device which will operate for any type of radiation beam. Such a device would be able to overcome the limitations of a glass lens, such as the chromatic aberration associated with the index of refraction of the glass in a glass lens. In operating in the lower frequencies, such as with infrared radiation, it is desirable to limit the absorption of any light to a minimum. Certain devices, such as night vision devices, operate in the infrared range. Therefore, absorption of light in such a device is to be minimal, if at all. Additionally, such a device which will operate in a harsh environment without affecting the focal qualities of the lens would be desirable.

DICLOSURE OF THE INVENTION

It is therefore an object of the present invention to provide a total transmissibility optical system which will reflect light rays and focus them at a focal point similar to that of an ordinary glass lens.

It is another object of the present invention to provide a focusing optical system which can be utilized in harsh environments, such as an irradiated environment.

It is a further object of the present invention to provide a focusing optical system which will focus any type of radiation beam, such as an infrared radiation beam.

It is a still further object of the present invention to provide an optical system which will transmit the full radiation beam and not absorb any of the beam or transmit any rays tending to have a chromatic aberration away from the focal point.

The above objects are attained by the present invention, according to which, briefly stated, an apparatus for focusing a generally parallel beam of radiation at a focal point comprises an assembly of four reflectors cooperating to focus the beam of radiation to a point. The four reflectors are comprised of: a first reflector having a generally conical shaped outer reflective surface oriented so that the axis thereof is generally parallel to the beam; a second reflector having a generally paraboloidal inner reflective surface which generally surrounds the first reflector and has an aperture for admitting the beam of radiation to the first reflector; a third reflector abutting the second reflector and having a generally conical shaped inner reflective surface, the third reflector having an aperture formed by the removal of its apex for transmission of the focused radiation beam therethrough, and the second and third reflective surfaces having a contiguous margin; and a fourth reflector having a generally conical shaped outer reflective surface is generally surrounded by the third reflector and abuts the first reflector and the axis thereof generally parallel to the beam, the first and fourth reflective surfaces having a contiguous margin.

BRIEF DESCRIPTION OF THE DRAWINGS

Various other objects, features, and advantages of the invention will become more apparent by reading the following detailed description in conjunction with the drawings, which are show by way of example only, wherein.

DESCRIPTION OF THE PREFERRED EMBODIMENTS

Figure 1:
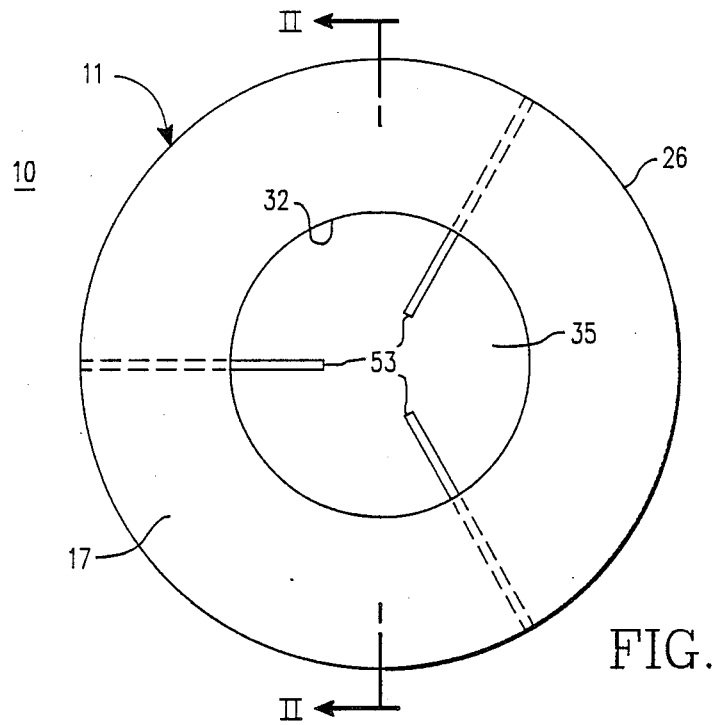
FIG. 1 is an end view of the total transmissibility lens of the present invention.
Figure 2:
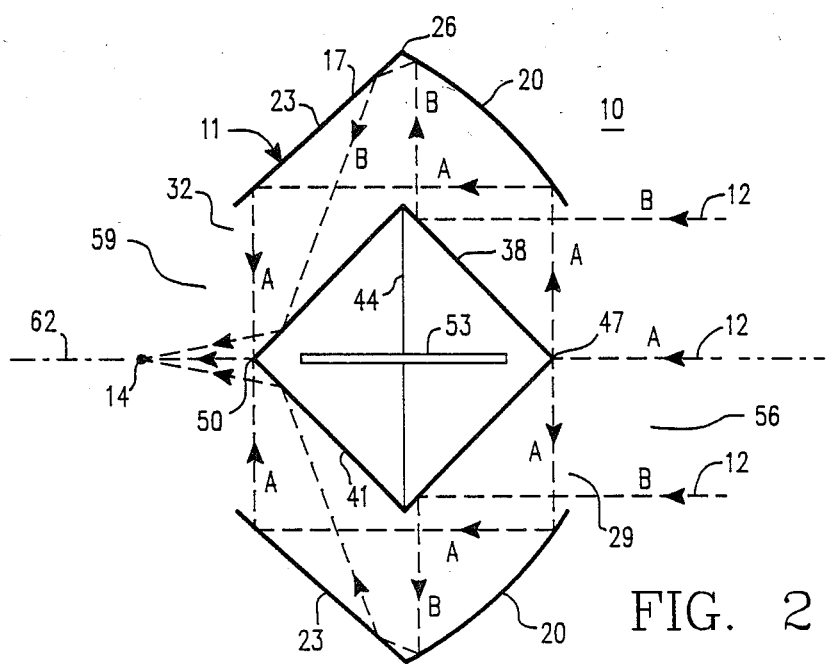
FIG. 2 is a side view of the device of the present invention taken along the line II—II of FIG. 1.

Referring now to the drawings in detail, FIGS. 1 and 2 show one embodiment of the present invention, a total transmissibility optical system 10. The optical system or lens 10 comprises an assembly of curved reflectors or mirrors arranged such that a parallel beam 12 of radiation, as represented in FIG. 2 by rays A and B, will reflect through the lens and come to a focus at a focal point 14 on the opposite side. All the individual mirrors comprise curves of revolution, symmetrically curved about a centerline. In the first embodiment 11, outer member 17 is comprised of a first reflector 20 generally in the shape of a hollow segment of paraboloid of revolution and a second reflector 23 generally in the shape of a hollow truncated cone. The base 26 of the two reflectors 20, 23 are joined such that two apertures 29, 32 respectively, are provided at opposed ends of the outer member 17. Coaxially disposed within the outer member 17 is an inner member 35. The inner member 35 is further comprised of two generally conical reflectors 38, 41 which are also joined at their respective bases 44. With this arrangement the conical reflectors 38, 41 have their axes generally parallel to beam 12 and the respective vertices 47, 50 of the inner member 35 are directly opposed such that one of each of the vertices 47, 50 of the conical reflectors 38, 41 is disposed adjacent each of the apertures 29, 32 of the first 20 and second 23 reflectors of the outer member 17. As a means for securing the inner member 35 within the outer member 17, a plurality of thin members or spider vanes 53 are provided. Preferably, three such spider vanes 53 are secured between the inner member 35 and the outer member 17 in such a manner that a minimal amount of rays in the radiation beam 12 are obstructed.

In FIG. 2 the generally parallel radiaton beam 12, such as an infrared beam, is shown entering the apparatus on a side 56 adjacent the paraboloidal reflector 20 of the outer member 17. The beam 12 enters the apparatus 11 and is reflected off a first reflector, one of the conical reflectors 38 of the inner member 35, in a direction towards the paraboloidal reflector 20 of the outer member 17. After reflecting off the second reflector 20, the beam 12 is then reflected therefrom in a direction towards a third reflector, the truncated cone reflector 23 of the outer member 17. The rays are then reflected toward a fourth reflector, the other conical reflector 41 of the inner member 35, and is finally reflected by the other conical reflector 41 through the other of the apertures 32 of the outer member 17 so as to be focused at a focal point 14 on the opposite side 59.

FIG. 2 also shows that rays A near the center line 62 of the assembly 11 reach the focal point 14 without any final angular deviation. This assembly 11 behaves optically in the same manner as a glass lens, because essentially all the radiation or light passes through except for that which may be blocked by the thin spider vanes 53, and because rays A and B converge to a focal point 14 in the same manner as if they were passed through a glass lens but without any chromatic aberration.

Figure 3:
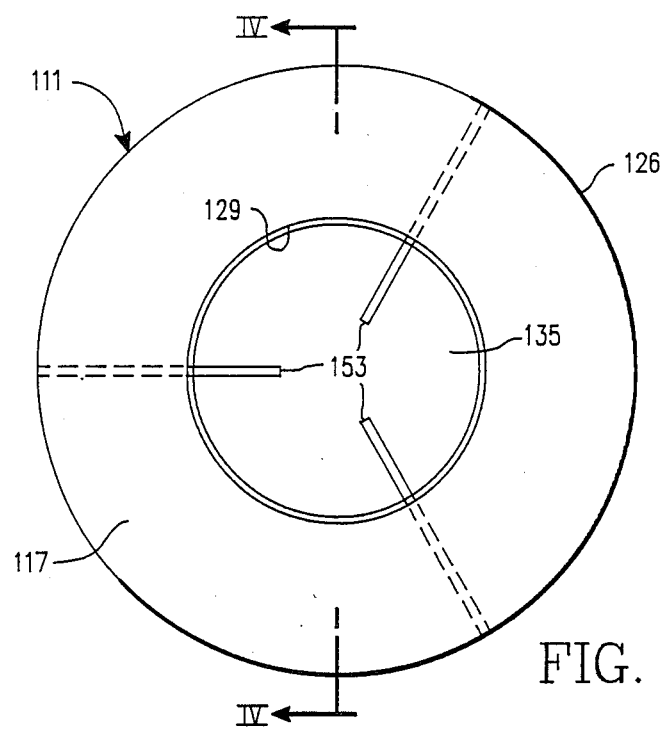
FIG. 3 is an end view of a second embodiment of the present invention.
Figure 4:
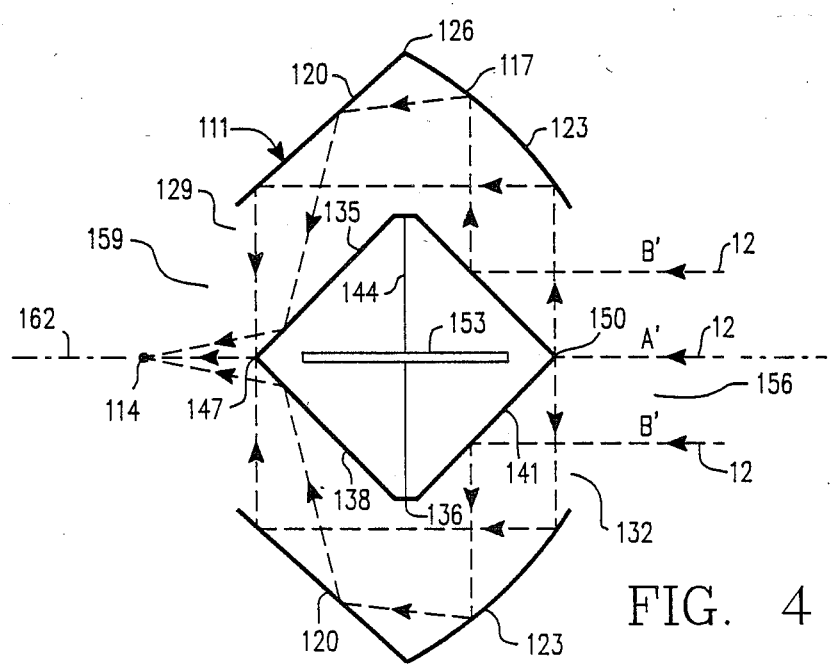
FIG. 4 is a side view of the device in FIG. 3 taken along the line IV—IV.

FIGS. 3 and 4 show a second embodiment of an optical system or lens 111 of the present invention wherein the radiation beam 12 having rays typical of any radiation, as represented by rays A' and B', are focused at a focal point 114. In this embodiment 111 the reflector made of the hollow segment of paraboloid of revolution 120 of the outer member 117 has been rotated 180° such that the radiation beam 12 enters the outer member 117 through the aperture 132 adjacent the hollow truncated cone reflector 123 of the outer member 117. As in the other embodiment, the reflectors 120, 123 of the outer member 117 have a contiguous margin 126 at their bases. In this embodiment 111 the inner member 135, at the point 136 where the respective bases 144 of the conical reflectors 138, 141 are joined, is shortened or cropped due to the way the rays of the radiation beam 12 are reflected within the lens 111. In this embodiment the radiation beam 12 enters the lens through the aperture 132 on a side 156 adjacent the truncated cone reflector 123 and is first reflected off one of the conical reflectors 141 of the inner member 135 in a direction towards the second reflector, the truncated cone outer reflector 123. The rays are then reflected in a direction toward the third reflector, the paraboloidal reflector 120 of the outer member 117 and reflected in a direction towards the third reflector, the other conical reflector 138 of the inner member 135. The radiation beam 12 is then brought to a focus at the focal point 114 after being directed throgh the other aperture 129 on the opposite side 159 of the lens 111 by the fourth reflector, the other conical reflector 138. Because of the way the rays near the center line 162 of the lens 111, as represented by ray A', are reflected by the first reflector 138 near its vertex 147 and the fourth reflector 141 near its vertex 150, the ends 165 of the bases 144 of the conical reflectors 138, 141 need to be shortened. In this manner all the rays of the radiation beam 12 can be brought to a focus at the focal point 114, and only those rays obstructed by the thin spider vanes 153 may be obstructed.

In both embodiments 11, 111 of the invention 10 the location of the focal point 14, 114 will shift to the left, with respect to the figures, as the size of the paraboloid increases, because as the paraboloid size increases, its curvature will decrease. However, increasing the size of the parabola does not necessitate moving the paraboloidal reflector 20, 120 of the outer member 17, 117 radially outward.

The total transmissibility optical system 10 of the present invention has its main advantage over a glass lens in that it will function over the entire radiation spectrum. Moreover, the device of the present invention has a second advantage over a glass lens due to the absence of any chromatic aberration associated with the index of refraction of a glass lens. Moreover, no light is absorbed by the total transmissibility lens 10; only the light rays which may be obstructed by the thin spider vanes 53, 153 (which are shown enlarged with respect to the members for clarity in the figures) may not be transmitted.

Preferably, the total transmissibility lens 10 will be made of a highly polished metallic material such as stainless steel or chrome, which will not be affected by its use in a harsh environment. Thus, an irradiated environment will not effect the transmissibility of the lens due to the fact that its surface will not become opaque as will a glass lens. Similar harsh environments, such as that involving thermal gradients or where mechanical shock is present, will not affect the total transmissibility lens 10 made of such a durable metallic material.

Figure 5:
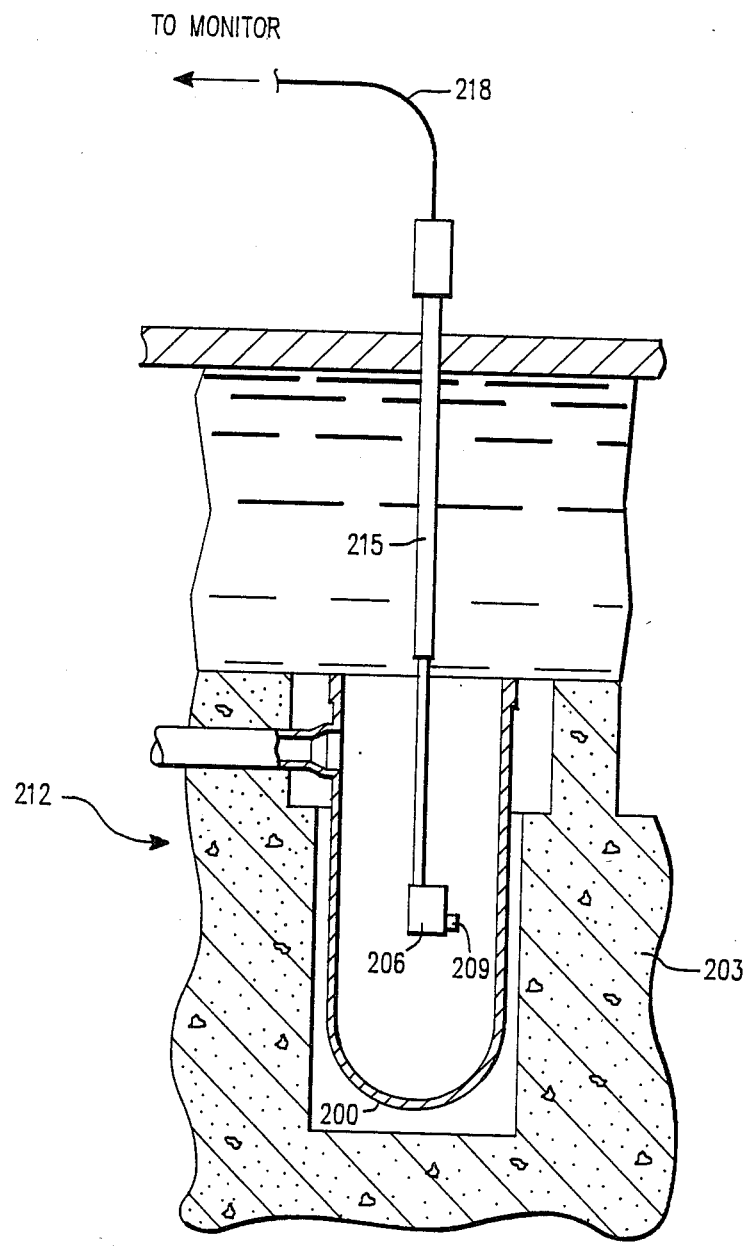
FIG. 5 is a schematic representation of an example of the use of the device of the present invention in inspection of a nuclear reactor vessel.

An example of such use is within a microscope or camera, or some such similar optical device, used to examine the interior of a reactor vessel 200 (see FIG. 5). The reactor vessel 200 is situated within a typically concrete containment building 203. Since a reactor vessel 200, and the containment building 203, define an irradiated environment, inspections therein are preferably conducted from a remote location. This is possible with the total transmissibility lens 10 of the present invention. A camera 206 having a total transmissibility optical system 209 associated therewith, is lowered into the reactor vessel 200, which is generally kept under water within a reactor cavity 212 of the containment building 203 during typical maintenance operations such as refueling, by means of a long handled tool 215 which may be manipulated by an overhead crane (not shown). The image received by the camera 206 would be sent on to a viewing device such as a television monitor (not shown) at a remote location by means of cable 218 and recorded for analysis and evaluation of the reactor vessel 200. In this manner the interior of the reactor vessel 200, as well as associated components such as the reactor internals and fuel assemblies (not shown) can be inspected from a remote location, without the need of periodically removing the camera 206 in order to replace a conventional glass lens which may have become opaque due to its use in an irradiated environment. It is understood that such an optical system may also be utilized to observe other maintenance operations that are taking place, such as the refueling of the reactor core, in addition to inspection of the reactor vessel 200 itself; as well as other components of a plant which may be situated within a hazardous environment.

When used in a telescope the total transmissibility optical system or lens 10 has an advantage over a glass lens in that substantially all the visible light is reflected and brought to a focus at the focal point 14, 114. Since the observation of most planetary objects must of necessity be conducted at night, the reflection of substantially all of the available light from such a distant object is important. Also, in order to have a clear view of such a distant object, the focusing of the lens of the telescope must be such that no aberration in the image produced is present.

Another situation in which the total transmissibility lens 10 of the present invention is advantageous is its use in a night vision device. In such a device the infrared radiation given off by objects can be utilized in visualizing that object. Since the total transmissibility lens 10 can be utilized in a wide range of the radiation spectrum, it offers a significant advantage over a glass lens. Any type of radiation beam can be brought to a focus at a focal point by its reflection within the total transmissibility lens 10.

The variety of applications for various types of lenses is enormous. The total transmissibility 10 lens offers significant advantages, such as for use in a microscope, over glass lense in that it will not absorb a significant part of the light in a glass lens as is common with typical prior art lenses.

While specific embodiments of the invention have been described in detail, it will be appreciated by those skilled in the art that various modifications and alterations would be developed in light of the overall teachings of the disclosure. Accordingly, the particular arrangement disclosed are meant to be illustrative only and not limiting as the scope of the invention which is to be given the full breadth of the appended claims and in any and all equivalents thereof.

What is claimed is:

1. Apparatus for focusing a generally parallel beam of radiation to a focal point, said focusing apparatus comprising:
   a first reflector having a generally conical shaped outer reflective surface, the conical reflective surface being oriented so that the axis thereof is generally parallel to the beam;
   a second reflector having a generally paraboloidal inner reflective surface which generally surrounds the first reflector and has an aperture for transmitting the beam of radiation therethrough;
   a third reflector abutting the second reflector and having a generally conical shaped inner reflective surface, the third reflector having an aperture formed by the removal of its apex for transmission of the focused radiation beam therethrough and said second and third reflective surfaces having a contiguous margin; and
   a fourth reflector generally surrounded by the third reflector abutting the first reflector and having a generally conical shaped outer reflective surface with the axis thereof generally parallel to the beam, and said first and fourth reflective surfaces having a contiguous margin, the four reflectors cooperating to focus the beam of radiation to a point.

2. The focusing apparatus as recited in claim 1, wherein the apex of the first reflector is oriented towards the unfocused parallel beam, and the apex of the fourth reflector is oriented towards the focal point of the focused beam.

3. The focusing apparatus as recited in claim 1, wherein the apex of the fourth reflector is oriented towards the unfocused parallel beam, and the apex of the first reflector is oriented towards the focal point of the focused beam.

4. The focusing apparatus as recited in claim 1, wherein said four reflectors are constructed of a metallic material.

5. A microscope lens for transmitting substantially all of a radiation beam and focusing it to a focal point within a microscope, said microscope lens comprising:
   a first reflector having a generally conical shaped outer reflective surface, the conical reflective surface being oriented so that the axis thereof is generally parallel to the beam;
   a second reflector having a generally paraboloidal inner reflective surface which generally surrounds the first reflector and has an aperture for transmitting the beam of radiation therethrough;
   a third reflector abutting the second reflector and having a generally conical shaped inner reflective surface, the third reflector having an aperture formed by the removal of its apex for transmission of the focused radiation beam therethrough and said second and third reflective surfaces having a contiguous margin; and
   a fourth reflector generally surrounded by the third reflector abutting the first reflector and having a generally conical shaped outer reflective surface with the axis thereof generally parallel to the beam, and said first and fourth reflective surfaces having a contiguous margin, the four reflectors cooperating to focus the beam of radiation to a point.

6. The microscope lens as recited in claim 5, wherein the apex of the first reflector oriented towards the unfocused parallel beam, and the apex of the fourth reflector is oriented towards the focal point of the focused beam.

7. The microscope lens as recited in claim 6, wherein the radiation beam to be focused is an infrared radiation beam.

8. The microscope lens as recited in claim 6, wherein the radiation beam to be focused is a visible light beam.

9. The microscope lens as recited in claim 6, wherein the lens is constructed of chrome.

10. The microscope lens as recited in claim 5, wherein the apex of the fourth reflector is oriented towards the unfocused parallel beam, and the apex of the first reflector is oriented towards the focal point of the focused beam.

11. The microscope lens as recited in claim 10, wherein the radiation beam to be focused is an infrared radiation beam.

12. The microscope lens as recited in claim 10, wherein the radiation beam to be focused is a visible light beam.

13. The microscope lens as recited in claim 10, wherein the lens is constructed of chrome.

14. Apparatus for focusing a beam of radiation to a focal point, said focusing apparatus comprising:

an outer member further comprised of a first inner reflective surface generally in the shape of a hollow segment of paraboloid of revolution and a second inner reflective surface generally in shape of a hollow truncated cone, the base of the first inner reflective surface being joined to the base of the second inner reflective surface such that two apertures are provided at opposed ends of the outer member;

an inner member further comprised of two generally conical outer reflective surfaces joined at their respective bases such that their vertices are directly opposed and their axes are generally parallel to the radiation beam; and means for coaxially securing the inner member within the outer member such at one of each of said vertices of said outer conical reflective surfaces of the inner member is disposed adjacent one of each of said apertures of said first and second inner reflective surfaces of the outer member, whereby said beam of radiation entering the apparatus through one of said apertures at one side is brought to a focus at a point on the opposite side.

15. The focusig apparatus as recited in claim 14, wherein the one side is adjacent the first inner reflective surface and the opposite side is adjacent the second inner reflective surface, such that said beam of radiation enters the apparatus through the one of said apertures and is reflected by one of said outer conical reflective surfaces of the inner member towards the outer member, is then reflected by the first inner reflective surface of the outer member towards the second inner reflective surface, is then reflected by the second inner reflective surface of the outer member towards the inner member, and is finally reflected by the other outer conical reflective surface of the inner member through the other of said apertures so as to be focused at said focal point.

16. The focusing apparatus as recited in claim 15, wherein said means for securing the inner member within the outer member is comprised of a plurality of thin vanes secured between said inner and outer members.

17. The focusing apparatus as recited in claim 14, wherein the one side is adjacent the second inner reflective surface and the opposite side is adjacent the first inner reflective surface, such that said beam of radiation enters the apparatus through the one of said apertures and is reflected by one of said conical outer reflective surfaces of the inner member towards the outer member, is then reflected by the second inner reflective surface of the outer member towards the first inner reflective surface, is then reflected by the first inner reflective surface of the outer member towards the inner member, and is finally reflected by the other conical outer reflective surface of the inner member, through the other of said apertures so as to be focused at said focal point.

18. The focusing apparatus as recited in claim 17, wherein said means for securing the inner member within the outer member is comprised of a plurality of thin vanes secured between said inner and outer members.

19. The focusing apparatus as recited in claim 14, wherein said inner and outer members are constructed of a metallic material.

20. The focusing apparatus as recited in claim 14, wherein said inner and outer members are constructed of polished stainless steel.

21. An inspection device for a nuclear reactor vessel, said inspection device comprising a camera having an optical system for transmitting and focusing substantially all of a light beam therein and constructed of a material which is substantially resistant to radiation, means for positioning the camera within the reactor vessel, and means for viewing images received by the camera at a remote location, wherein said total transmissibility optical system further comprises:

a first reflector having a generally conical shaped outer reflective surface, the conical reflective surface being oriented so that the axis thereof is generally parallel to the light beam;

a second reflector having a generally paraboloidal inner reflective surface which generally surrounds the first reflector and has an aperture for transmitting the light beam therethrough;

a third reflector abutting the second reflector and having a generaly conical shaped inner reflective surface, the third reflector having an aperture formed by the removal of its apex for transmission of the focused light beam therethrough and said second and third reflective surfaces having a contiguous margin; and a fourth reflector generally surrounded by the third reflector abutting the first reflector and having a generally conical shaped outer reflective surface with the axis thereof generally parallel to the light beam, and said first and fourth reflective surfaces having a contiguous margin, the four reflectors cooperating to focus the beam of light to a point.

22. The nuclear reactor vessel inspection device as recited in claim 21, wherein said reflectors of the total transmissibility optical system are constructed of stainless steel.

23. The nuclear reactor vessel inspection device as recited in claim 21, wherein said reflectors of the total transmissibility optical system are constructed of chrome.

24. The nuclear reactor vessel inspection device as recited in claim 21, further comprising means for storing said images received by the camera.

* * * * *